United States Patent [19]

Ayers et al.

[11] Patent Number: 5,624,027

[45] Date of Patent: Apr. 29, 1997

[54] APPARATUS FOR SECURING A COMPUTER DISKETTE TO AN OBJECT

[75] Inventors: D. Leann Ayers, 943 N. Fouth St., Philadelphia, Pa. 19123; Matthew D. Marhefka, Doylestown, Pa.; Joseph M. Torsella, 301 S. 19th St., Philadelphia, Pa. 19103

[73] Assignees: Joseph M. Torsella; D. Leann Ayers, both of Philadelphia, Pa.

[21] Appl. No.: 438,419

[22] Filed: May 10, 1995

[51] Int. Cl.$^6$ ........................................ B65D 85/30
[52] U.S. Cl. ..................... 206/308.3; 206/307; 206/425
[58] Field of Search ............... 206/308.1, 308.3, 206/387.1, 307, 309, 310, 311, 312, 313, 425, 232, 472; 24/3.7, 3.8, 3.9, 3.11, 3.12

[56] References Cited

U.S. PATENT DOCUMENTS

| | | | |
|---|---|---|---|
| 1,555,714 | 9/1925 | Kahn | 24/3.12 |
| 1,713,760 | 5/1929 | Kuester | 24/3.7 |
| 1,816,049 | 7/1931 | Lamer | 24/3.7 X |
| 3,823,814 | 7/1974 | Lum | 206/225 |
| 4,022,322 | 5/1977 | Louzil | 206/387 |
| 4,241,859 | 12/1980 | Eames | 224/312 |
| 4,498,583 | 2/1985 | Long et al. | 206/308.3 X |
| 4,676,374 | 6/1987 | Wilkins | 206/309 X |
| 4,768,648 | 9/1988 | Glass | 206/38 |
| 4,844,247 | 7/1989 | Moy | 206/232 |
| 4,876,310 | 10/1989 | Cannon et al. | 206/387 |
| 4,940,142 | 7/1990 | Behrens et al. | 206/444 |
| 4,948,022 | 8/1990 | Van Dyke | 206/308.1 X |
| 4,957,205 | 9/1990 | Rose, Jr. | 206/444 |
| 5,027,950 | 7/1991 | Gutierrez et al. | 206/425 |
| 5,031,772 | 7/1991 | Woodrduff | 206/444 |
| 5,129,509 | 7/1992 | Romolt | 24/3.8 X |
| 5,224,599 | 7/1993 | Uchida | 206/308.3 |
| 5,255,779 | 10/1993 | Koenig, III | 206/232 |
| 5,261,583 | 11/1993 | Long et al. | 24/3.7 X |
| 5,275,438 | 1/1994 | Struhl | 281/31 |
| 5,288,144 | 2/1994 | Guderyon | 206/232 X |
| 5,407,073 | 4/1995 | Uchida | 206/308.3 |

*Primary Examiner*—David T. Fidei
*Attorney, Agent, or Firm*—Panitch Schwarze Jacobs & Nadel, P.C.

[57] ABSTRACT

An apparatus for securing a computer diskette to an object. The diskette securing apparatus comprises a diskette holder and a retaining member extending from the diskette holder. The retaining member is adapted to engage the object to secure the diskette holder to the object.

2 Claims, 4 Drawing Sheets

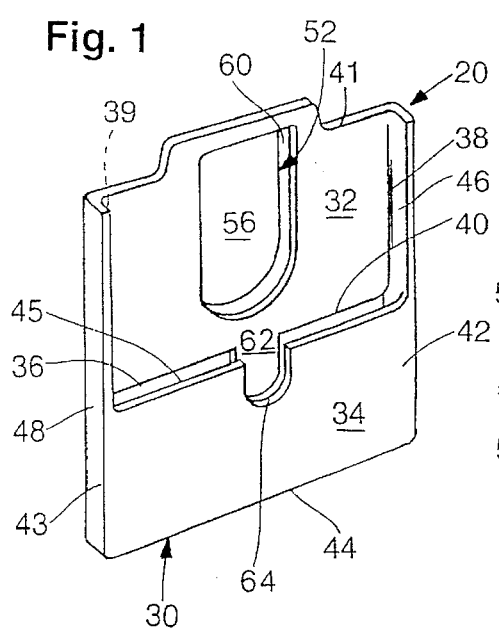
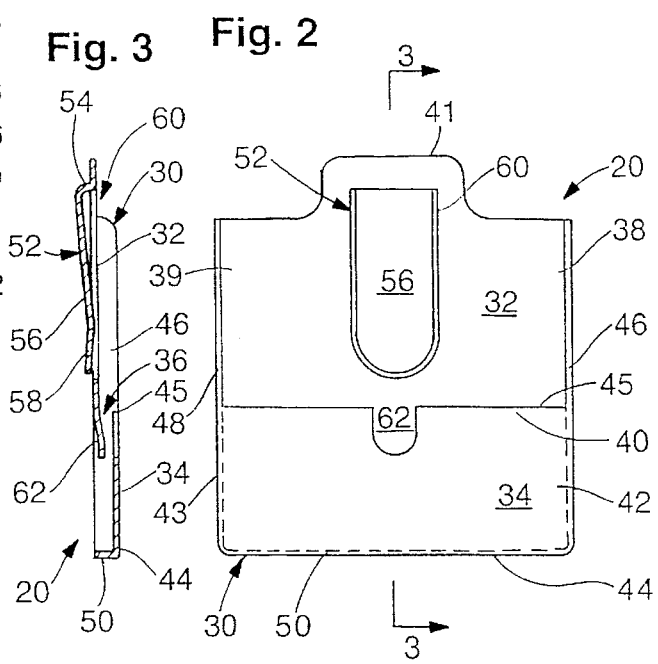
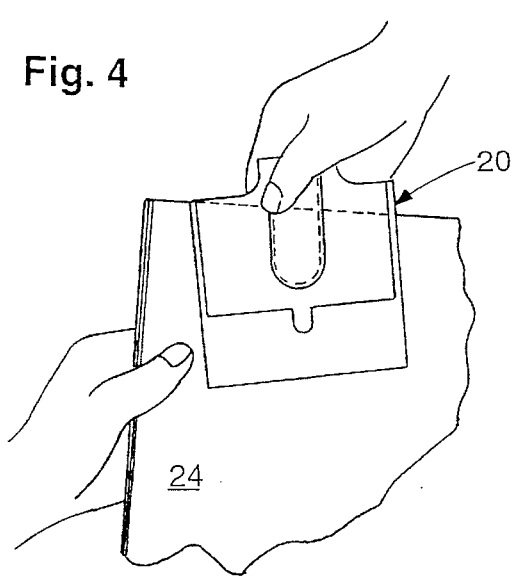
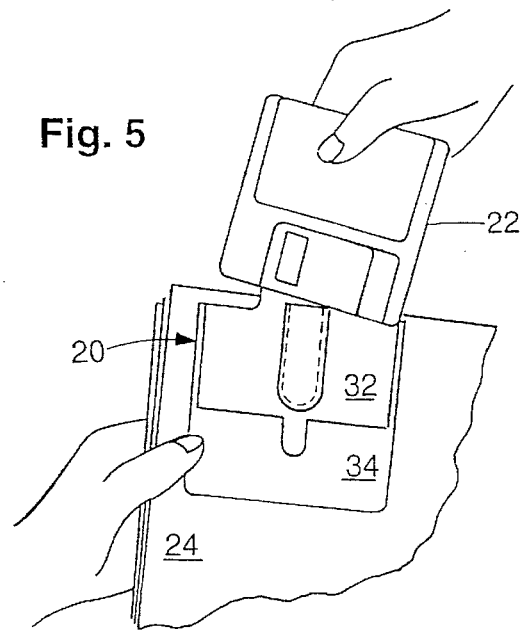

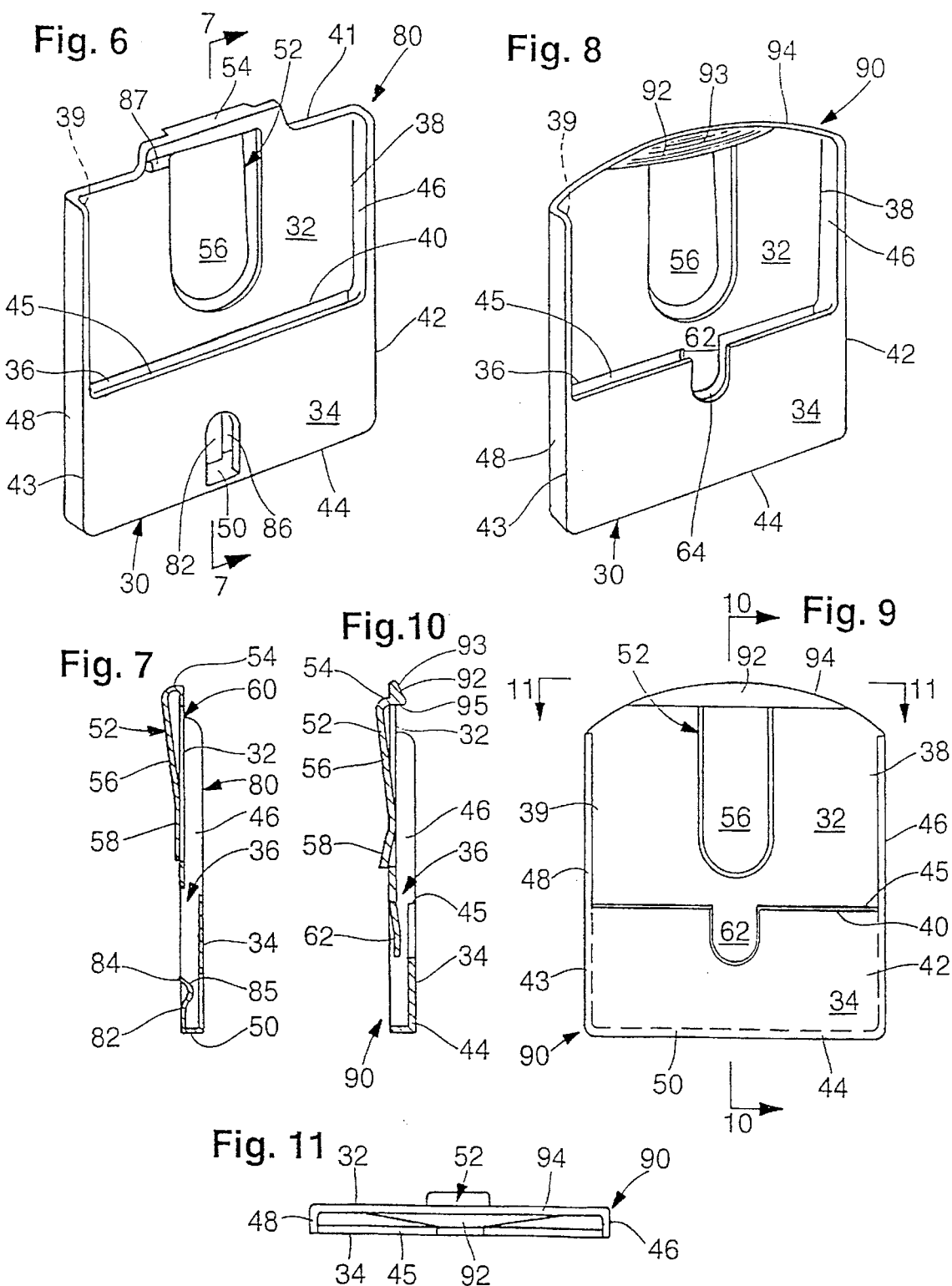

APPARATUS FOR SECURING A COMPUTER DISKETTE TO AN OBJECT

FIELD OF THE INVENTION

The present invention relates to an apparatus for securing a computer diskette or other similarly shaped information-bearing medium to an object. More particularly, the present invention is directed to a diskette holder having a retaining member extending from one side thereof, with the retaining member being adapted to engage a file, document or other object to secure an associated diskette to the file, document or other object.

BACKGROUND OF THE INVENTION

With the increasing use of personal computers in businesses, as well as in the home, there is a continuing need for improved methods for storing, handling and tracking computer diskettes. While hard copies of documents which are maintained in manual files can usually be easily located, tracking down a disk copy of a particular document once the hard copy of the document is located is often times difficult, if not impossible. Often times, it ends up being more efficient to retype a document than to search for the disk copy, or to search through various diskettes by inserting them into a computer in order to determine the contents of the diskettes.

This problem has increased as the practice of obtaining and processing information in hard copy and disk copy form has become more widespread. It is now common for a manuscript or business proposal submission to contain both a diskette and a hard copy. Additionally, with more professionals splitting time between the office and the home, there is a growing need for a way to securely transport a disk copy along with a hard copy.

It is known in the prior art to file or attach a disk to each document, file or other object so that the disk copy of a document or group of documents is always locatable. One method for accomplishing this was to use rubber bands or paper clips to hold a computer diskette to a file or document. However, these devices did not securely hold the diskette to the documents or file, and the diskettes were sometimes lost or damaged.

One prior art device addressed this problem by providing a paper envelope with an adhesive which could be attached to a document or file. The associated computer diskette is placed in the envelope to keep the disk copy of the document together with the hard copy.

Folders or plastic sleeves with specific disk pockets are also known in the prior art for use in keeping a computer diskette with an associated file. These folders are provided with a built in diskette pocket for maintaining the computer diskette with the file.

The known prior art methods for attaching a computer diskette to an associated document or file have proved unsatisfactory for a number of reasons. Diskettes stored in envelopes attached to the file often fall out of the envelopes after repeated usage. Non-transparent envelopes or other types of non-transparent holders also obscure the view of the diskette's label. Additionally, non-rigid envelopes do not offer protection for the diskettes, and the adhesive attachment of the envelope to a document can damage the document and is often not secure. Folders having disk pockets or compartments built in do not provide a method for temporarily attaching a diskette to a single document and require specialized folders. The other known methods, such as rubber bands and paper clips, often fail to hold the diskette in place, and the use of binder clips has been avoided because of the possibility of damaging the diskette.

The present invention is a result of the observation of the limitations with the prior art devices and efforts to solve them.

SUMMARY OF THE INVENTION

Briefly stated, the present invention comprises an apparatus for securing a computer diskette to an object. The diskette securing apparatus comprises a diskette holder and a retaining member extending from the diskette holder. The retaining member is adapted to engage the object to secure the diskette holder to the object.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a perspective view of a first embodiment of an apparatus for securing a computer diskette to an object in accordance with the present invention;

FIG. 2 is a front elevational view of the diskette securing apparatus of FIG. 1;

FIG. 3 is a section view of the diskette securing apparatus taken along lines 3—3 in FIG. 1;

FIG. 4 is a elevational view of the diskette securing apparatus being secured to an object;

FIG. 5 is an elevational view similar to FIG. 4 showing a computer diskette being inserted into the diskette securing apparatus;

FIG. 6 is a perspective view of a second preferred embodiment of an apparatus for securing a computer diskette to an object in accordance with the present invention;

FIG. 7 is a section view of the diskette securing apparatus taken along lines 7—7 in FIG. 6;

FIG. 8 is a perspective view of a third preferred embodiment of an apparatus for securing a computer diskette to an object in accordance with the present invention;

FIG. 9 is a front elevational view of the diskette securing apparatus of FIG. 8;

FIG. 10 is a section view of the diskette securing apparatus taken along lines 10—10 in FIG. 9;

FIG. 11 is a top view of the diskette securing apparatus taken along lines 11—11 in FIG. 9;

DETAILED DESCRIPTION OF PREFERRED EMBODIMENTS

Figure 12:
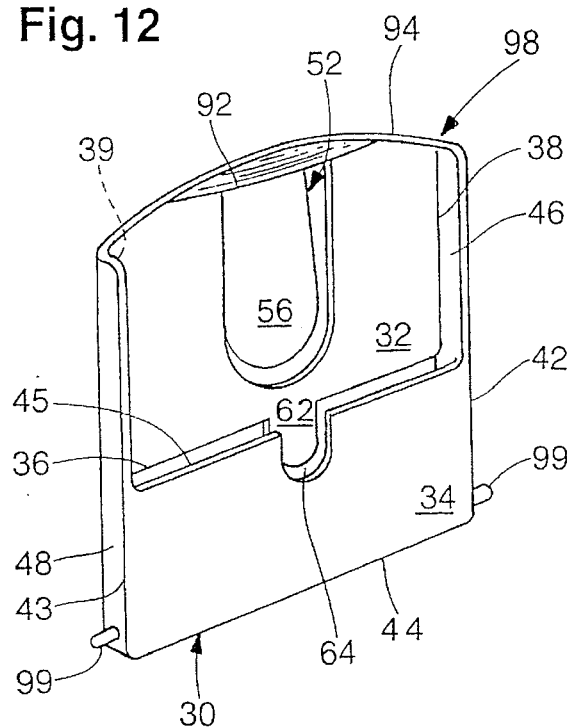
FIG. 12 is a perspective view of a fourth preferred embodiment of an apparatus for securing a computer diskette to an object in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the apparatus for securing a computer diskette to an object and designated parts thereof. The terminology includes the words above specifically mentioned, derivatives thereof and words of similar import.

Referring to the drawings, wherein like numerals indicate like elements throughout, there is shown in FIGS. 1–5 a first preferred embodiment of an apparatus 20 for securing a computer diskette to an object (hereinafter "the diskette securing apparatus 20") in accordance with the present invention.

Referring to FIGS. 1–3, the disk securing apparatus 20 includes a diskette holder 30 having a first panel 32 and a second panel 34, spaced from the first panel 32, such that a space 36 adapted for receiving a diskette 22 (shown in FIG. 5) is formed between the first and second panels 32 and 34. The first panel has opposing first and second edges 38 and 39, respectively, and opposing third and fourth edges 40 and 41, respectively. The second panel 34 also includes opposing first and second edges 42 and 43, respectively, and opposing third and fourth edges 44 and 45, respectively. A third panel 46 extends between the first edges 38 and 42 of the first and second panels 32 and 34, respectively. A fourth panel 48 extends between the second edges 39 and 43 of the first and second panels 32 and 34, respectively. A fifth panel 50 is attached to the third edge 44 of the second panel 34 and extends toward the first panel 32 such that the space 36 adapted for receiving the diskette is preferably formed between the first, second, third, fourth and fifth panels 32, 34, 46, 48 and 50, respectively. Preferably, the fifth panel is connected to the bottom edges of the third and fourth panels 46 and 48.

Still with reference to FIGS. 1–3, in the preferred embodiment, the distance between the third and fourth edges 44 and 45 of the second panel 34 is less than the height of the diskette which is adapted to be received in the space 36 for receiving the diskette 22 to allow a label on the diskette 22 to be visible when the diskette 22 is inserted in the diskette holder 30. Preferably, the bottom edge 40 of the first panel 32 ends in a position which is over the top edge 45 of the second panel 34 to facilitate manufacturing and to provide access for a user's hand to either surface of a diskette after it is inserted into the diskette holder 30. However, it is understood by those of ordinary skill in the art from the present disclosure that the sizes of the first, second, third, fourth and fifth panels 32, 34, 46, 48 and 50 can be varied as desired, for example, the first panel 32 could extend down such that the third edge 40 joined with the bottom panel. Additionally, the shapes of the panels 32, 34, 46, 48 and 50 can be varied, if desired, as long as a diskette receiving space 36 is provided.

In the preferred embodiment, the space 36 for receiving the diskette 22 in the diskette holder 30 is sized to receive a standard 3 ½ inch or 5 ¼ inch diskette. Preferably, the diskette holder 30 is injection molded from a polymeric material. However, it is understood by those of ordinary skill in the art that the diskette holder 30 can be made of other suitable materials, such as metal, and can be assembled by other suitable methods, such as bonding separate panels together, if desired. It is similarly understood that the panels can be replaced by other equivalent structures such as a wire frame (not shown) to form the diskette holder 30, if desired.

Still with reference to FIGS. 1–3, the disk securing apparatus 20 further comprises a retaining member 52 extending from the diskette holder 30. Preferably, the retaining member 52 comprises a spacer portion 54 extending out from the diskette holder 30. Preferably, the spacer portion 54 is affixed to the diskette holder 30 adjacent to the fourth edge 41 of the first panel 32. A resilient arm portion 56 depends from the spacer portion 54. As shown in FIG. 3, the resilient arm portion 56 has a free end 58 which is preferably biased toward the diskette holder 30.

As shown in FIG. 4, the retaining member 52 is adapted to engage an object 24, such as a document or file, to releasably secure the diskette holder 30 to the object.

In the preferred embodiment, the retaining member 52 is molded from a polymeric material and is integrally formed with the first panel 32 and the diskette holder 30. Preferably, an aperture 60 is formed in the first panel 32 which corresponds with the shape of the retaining member 52 to facilitate the manufacturing process. However, it is understood by those of ordinary skill in the art from the present disclosure that the method of manufacture can be varied, if desired, and the aperture 60 through the first panel 32 is optional. It is similarly understood that the retaining member 52 may have various shapes, such as a paper clip shape or any other suitable shape, and can be made of other materials, such as spring steel, or other metallic or polymeric materials, which are attached to the diskette holder 30 by a secondary operation, such as bonding or mechanical fastening, or is integrally attached during the molding process of the diskette holder 30. Additionally, it is similarly understood by those skilled in the art from the present disclosure that the retaining member 52 may be attached to the first, second, third, fourth or fifth panels 32, 34, 46, 48 and 50 of the diskette holder 30, if desired, and is illustrated as being attached to the first panel 32 for convenience only.

Those of ordinary skill in the art will also recognize from the present disclosure that the retaining member 52 need not be biased toward the first panel 32, as long as the retaining member 52 is adapted to engage an object 24, such as a document or file, to releasably secure the diskette holder 30 to the object.

Still with reference to FIGS. 1–3, the disk securing apparatus 20 further comprises a diskette retaining member 62 which depends from the third edge 40 of the first panel 32. Preferably, the diskette retaining member 62 is a resilient member which extends into the space 36 adapted for receiving the diskette 22.

As shown in FIG. 3, the diskette retainer 62 is preferably formed integrally with the first panel 32 and is biased toward the second panel 34 such that it engages a diskette 22 when the diskette is placed into the diskette receiving space 36.

In the preferred embodiment, the diskette retainer 62 is integrally formed with the diskette holder 30 during the molding process, as outlined above. Preferably, a notch 64 is provided in the second panel 34 which corresponds to the position and shape of the diskette retainer 62 in order to facilitate the manufacturing process. However, it is understood by those of ordinary skill in the art from the present disclosure that the diskette retainer 62 can be made from various other materials, such as spring steel, and can be attached to the diskette holder 30 by bonding, mechanical fastening, or any other equivalent method, in any position such that the diskette retainer 62 extends into the space 36 adapted for receiving the diskette 22. It is similarly understood by those of ordinary skill in the art that the diskette retainer is optional, and may be omitted, if desired.

Having described the structure of the first embodiment of the disk securing apparatus 20 in accordance with the present invention, a brief description of its installation and use follows with respect to FIGS. 4 and 5.

Preferably, the diskette 22 is first inserted into the diskette receiving space 36 in the diskette holder 30. As the diskette 22 is inserted, it contacts and displaces the diskette retainer 62 away from the second panel 34 such that the diskette retainer 62 releasably retains the diskette 22 in position. The disk securing apparatus 20 is then positioned with the first panel 32 against the surface of the object 24, such as a notebook or a printout of a computer file stored on the diskette 22. The disk securing apparatus 20 is then moved downwardly along the surface of the object 24 such that the resilient arm 56 of the retaining member 52 engages the object 24 and is forced away from the first panel 32 by the object 24, generating a clamping force in a direction normal to the surface of the object 24 and the first panel 32. The clamping force retains the disk securing apparatus 20 in position on the object 24.

Alternatively, the disk securing apparatus 20 is first secured to an object 24 by a user grasping the disk securing apparatus 20 and placing the first panel 32 against the surface of the object 24. The disk securing apparatus 20 is then moved downwardly along the surface of the object 24 such that the resilient arm 56 of the retaining member 52 engages the object 24 and is forced away from the first panel 32 by the object 24, generating a clamping force as described above to secure the diskette 22 to the object.

Referring now to FIG. 5, a user then inserts the diskette 22 into the disk receiving space 36 between the first and second panels 32 and 34. As the diskette 22 is inserted, it contacts and displaces the diskette retainer 62 away from the second panel 34. The diskette 22 is releasably retained in position by the force of diskette retainer 62 acting on the surface of the diskette 22.

Referring now to FIGS. 6 and 7, a second preferred embodiment of a diskette securing apparatus 80 in accordance with the present invention is shown. The second preferred embodiment of the diskette securing apparatus 80 is similar to the first preferred embodiment 20, and like elements have been identified with the same reference numerals. A brief description of the differences from the first preferred embodiment 20 follows.

As shown in FIGS. 6 and 7, the diskette retainer 82 comprises a resilient member affixed to the fifth panel 50. The diskette retainer 82 extends into the space 36 adapted for receiving the diskette 22. Preferably, the diskette retainer 82 is biased toward the second panel 34, and the free end 84 of the diskette retainer 82 turns back away from the second panel 34 creating a guide surface 85 for guiding a diskette 22 fully into the disk receiving space 36 so that the diskette 22 contacts the fifth panel 50.

Still with reference to FIGS. 6 and 7, the spacer portion 54 of the retainer member 52 extends directly from the fourth edge 41 of the first panel 32. Preferably, a second diskette retainer in the form of a security bump 87 is provided adjacent to the fourth edge 41 of the first panel 32. The security bump 87 protrudes toward the second panel 34 and is located a distance from the fifth panel 50 which is slightly greater than the height of the diskette 22 to be secured in the diskette receiving space 36.

Preferably, the diskette securing apparatus 80 in accordance with the second preferred embodiment of the invention is manufactured by injection molding in a similar manner to the first embodiment 20. Preferably, an aperture 86 is provided in the second panel 34 in a complimentary position to the diskette retainer 82 in order to facilitate manufacturing. However, it is understood by those of ordinary skill in the art from the present disclosure that the aperture 86 and the security bump 87 are optional, and the diskette securing apparatus 80 may be made by other processes as outlined above in connection with the first embodiment 20.

The second embodiment of a diskette securing device 80 is used in a similar fashion to the first embodiment 20, and accordingly, only the differences are described below. In order insert or to remove a diskette 22 from the diskette securing apparatus 80, the diskette securing apparatus 80 must be slightly flexed so that the security bump 87 is moved out of the path of the disk 22. The diskette 22 can then be inserted or removed by the user the diskette 22 into or out of the diskette holder 30.

Referring now to FIGS. 8–11, a third preferred embodiment of a diskette securing apparatus 90 in accordance with the present invention is shown. The diskette securing apparatus 90 in accordance with the third preferred embodiment of the invention is similar to the first preferred embodiment 20 and like elements have been identified with the same reference numerals. A description of the differences from the first preferred embodiment 20 follows.

Referring to FIGS. 8–11, the diskette securing device 90 in accordance with the third preferred embodiment of the invention includes a second diskette retainer 92 affixed to the diskette holder 30. Preferably, the second diskette retainer 92 is located adjacent to the fourth edge 94 of the first panel 32. The fourth edge 94 of the first panel 32 is preferably curved, and the second diskette retainer 92 protrudes from the fourth edge 94 of the first panel 32 toward the second panel 34. The second diskette retainer 92 is located a distance from the fifth panel 50 which is slightly greater than the height of the diskette 22 to be secured in the diskette receiving space 36.

As shown in FIGS. 10 and 11, the second diskette retainer 92 has a sloped first surface 93 and a second surface 95, which is preferably normal to the surface of the first panel 32 to form a detent above the top edge of an inserted diskette 22.

Preferably, the second diskette retainer 92 is integrally molded with the diskette holder 30 from a polymeric material. However, it is understood by those of ordinary skill in the art from the present disclosure that the second diskette retainer 92 could be made from various other materials, such as metal or other suitable polymeric materials, and can be attached in a secondary manufacturing operation by bonding or attachment with mechanical fasteners. It is similarly understood that the first diskette retaining member 62 can be omitted, if desired, depending on the particular application, such that only diskette retainer 92 is used to retain the diskette 22 in position.

The third embodiment of a diskette securing device 90 is used in a similar fashion to the first embodiment 20. However, in order to insert or remove a diskette 22 from the diskette securing apparatus 90, the diskette securing apparatus 90 must be flexed so that the second diskette retainer 92 is moved out of the path of the diskette 22.

Figure 13:
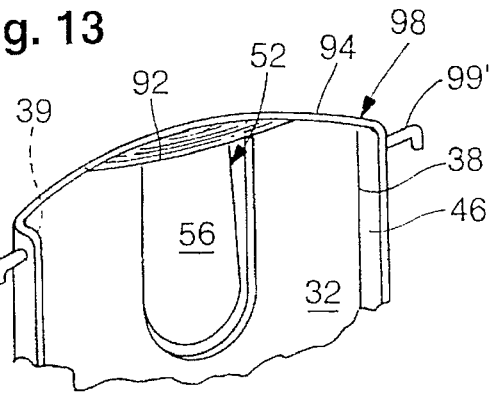
FIG. 13 is a partial perspective view similar to FIG. 12 illustrating an alternative pin placement for the embodiment of FIG. 12.

Referring now to FIGS. 12 and 13, a fourth preferred embodiment of a diskette securing apparatus 98 in accordance with the present invention is shown. The diskette securing apparatus 98 in accordance with the fourth preferred embodiment of the invention is similar to the third preferred embodiment 90 and like elements have been identified with the same reference numerals. A description of the differences from the third preferred embodiment 90 follows.

Referring to FIG. 12, the diskette securing device 98 in accordance with the fourth preferred embodiment of the invention includes a pair of pins 99 which protrude from the third and fourth panels 46 and 48 adjacent to the fifth panel 50. Preferably, the pins 99 are cylindrical in shape and are integrally molded with the diskette holder 30. However, it is understood by those of ordinary skill in the art from the present disclosure that the pins 99 can have other shapes, such as half-cylinders or hooks, and can be made from other suitable materials, such as metal, and may be attached in a secondary process, such as bonding or mechanical fastening, after the diskette holder 30 is manufactured. Additionally, the pins 99 may be located at any position on the diskette holder 30. For example, pins or hooks (shown as 99' in FIG. 13) could extend from the third and fourth panels 46 and 48 in proximity to the fourth edge 41 of the first panel 32 to form hangers by which the diskette securing apparatus can be suspended in a storage container.

The fourth embodiment of a diskette securing device 98 is used in a similar fashion to the third embodiment 90. However, the diskette securing apparatus 98 may be removably placed in a diskette storage container (not shown) having provisions for releasably holding and retaining the diskette securing device 98 by the pins 99, such as aligned holes or detents in the storage container. A diskette can then be stored or removably attached to a document or file 24 utilizing the same diskette securing device 98.

Figure 14:
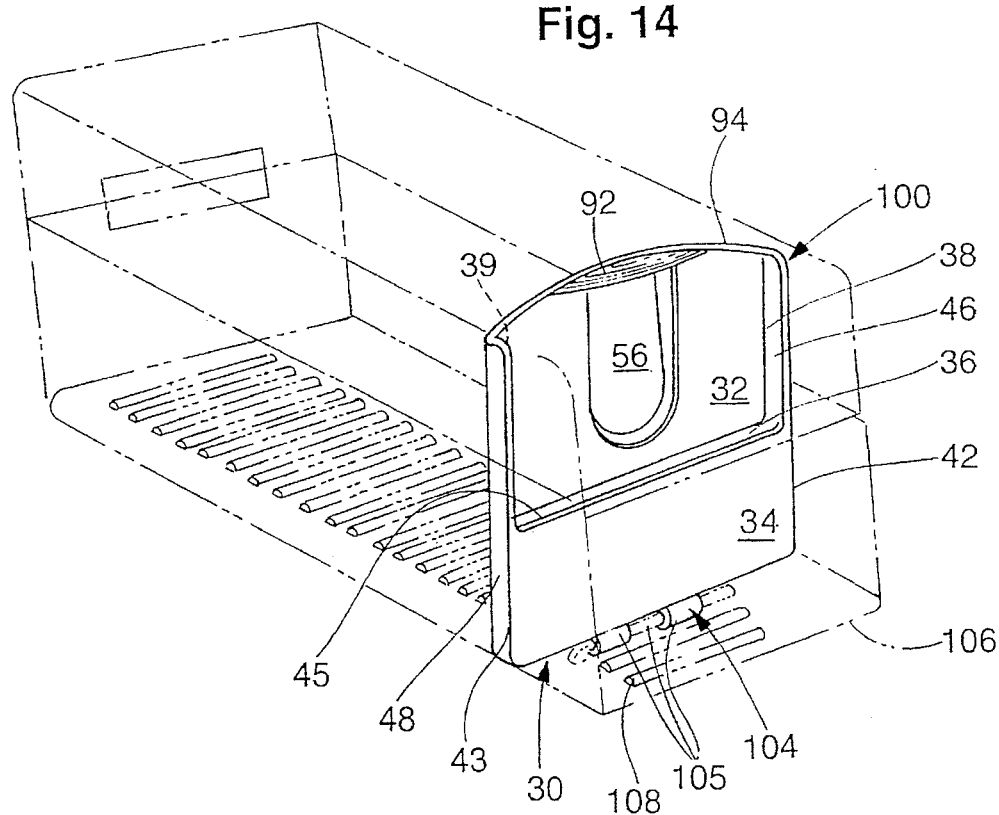
FIG. 14 is a perspective view of a fifth preferred embodiment of an apparatus for securing a computer diskette to an object in accordance with the present invention.

Referring now to FIG. 14, a fifth preferred embodiment of a diskette securing apparatus 100 in accordance with the present invention is shown. The diskette securing apparatus 100 in accordance with the fifth preferred embodiment of the invention is similar to the fourth preferred embodiment 98 and like elements have been identified with the same reference numerals. A description of the differences from the fourth preferred embodiment 98 follows.

Referring to FIG. 14, the diskette securing device 100 in accordance with the fifth preferred embodiment of the invention includes an open, resilient clamp member 104 having three prongs 105 which depend from the fifth panel 50. Preferably, the prongs 105 are configured to releasably engage a rod-like member and are integrally molded from a polymeric material with the diskette holder 30. However, it is understood by those of ordinary skill in the art from the present disclosure that the clamp member 104 can be made from other suitable materials, such as metal, and may be attached in a secondary process, such as bonding or mechanical fastening, after the diskette holder 30 is manufactured.

The fifth embodiment of a diskette securing device 100 is used in a similar fashion to the third embodiment 90. However, the diskette securing apparatus 100 may be removably placed in a diskette storage container 106 (shown in phantom) having rod-shaped members 108 in the bottom panel. The clamp member 104 of the diskette securing device 100 releasably engages the rod-shaped members 108 in the storage container, allowing pivotal motion of the diskette securing device 100 about the rod-like members 108 as well as easy removal. The diskette 22 can then be stored or removably attached to an object 24, such as a document or file, utilizing the same diskette securing device 100.

Figure 15:
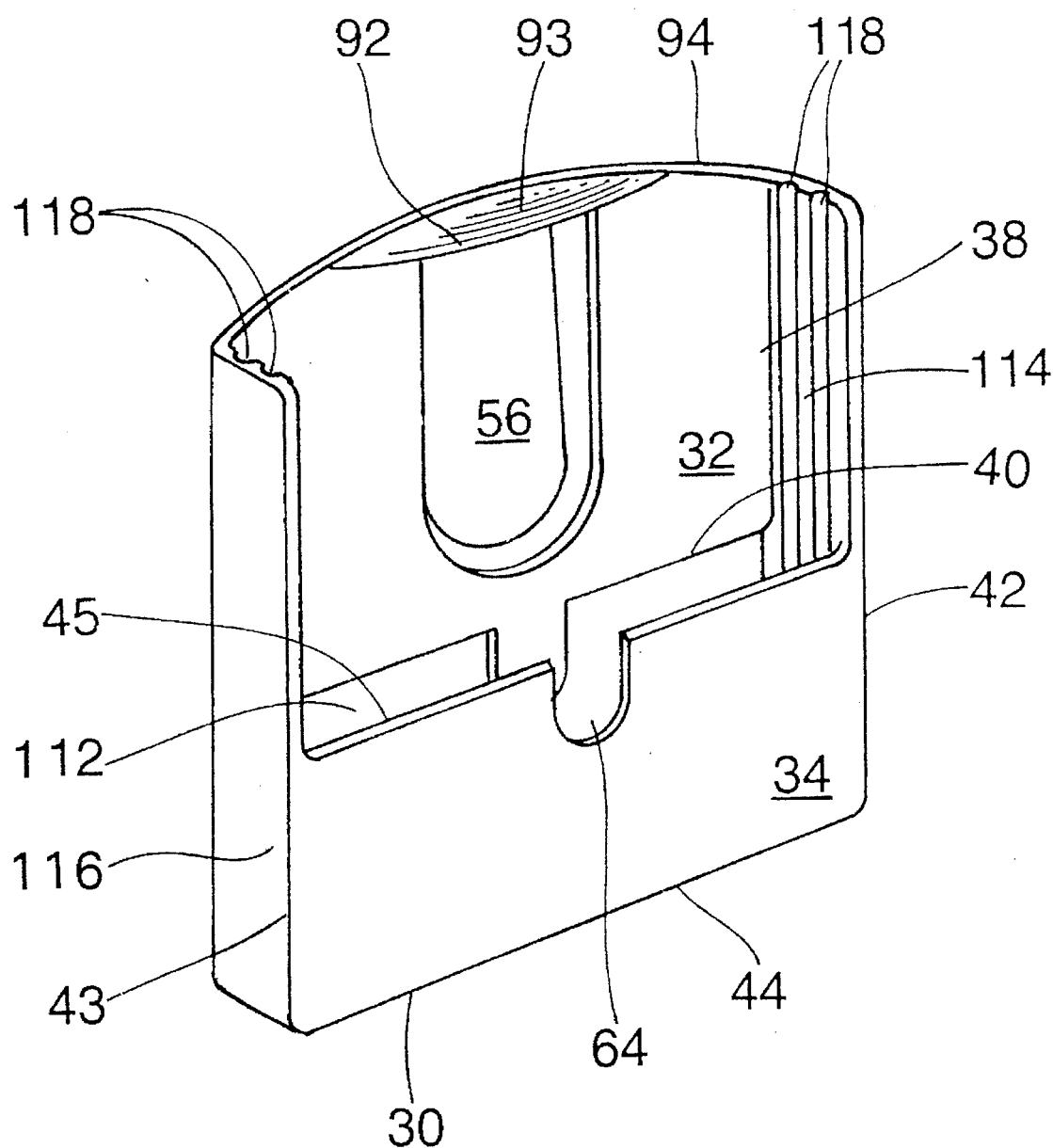
FIG. 15 is a perspective view of a sixth preferred embodiment of an apparatus for securing computer diskettes to an object in accordance with the present invention.

Referring now to FIG. 15, a sixth preferred embodiment of a diskette securing apparatus 110 in accordance with the present invention is shown. The diskette securing apparatus 110 in accordance with the sixth preferred embodiment of the invention is similar to the third preferred embodiment 90 and like elements have been identified with the same reference numerals. A description of the differences from the third preferred embodiment 90 follows.

Referring to FIG. 15, the diskette securing device 110 in accordance with the sixth preferred embodiment of the invention includes a diskette receiving space 112 which is adapted to accommodate two diskettes. The third and fourth panels 114 and 116 are similar to the third and fourth panels of the third embodiment 90 except that the width of the third and fourth panels 114 and 116 has been increased. The third and fourth panels 114 and 116 are also provided with grooves 118 which are adapted to receive the edges of the diskettes 22.

Preferably, the diskette securing device 110 in accordance with the sixth embodiment of the invention is adapted to secure two diskettes 22 to an object 24. However, it is understood by those of ordinary skill in the art from the present disclosure that the device 110 may be adapted to hold more than two diskettes, depending on the particular application. Additionally, it is similarly understood that various combinations of the diskette retains, such as the diskette retainer 62 of the first embodiment, the diskette retainer 82 of the second embodiment, or the security bump 87 of the second embodiment may be used to retain the diskettes 22 in the diskette securing device 110, or the spacing of the third and fourth panels 114 and 116 can be set at a distance to provide frictional contact between the grooves 118 and the edges of the diskettes 22.

The sixth embodiment of a diskette securing device 110 is used in a similar fashion to the previous embodiments, except multiple diskettes 22 can be secured to an object 24.

It will be appreciated by those skilled in the art that changes could be made to the embodiments described above without departing from the broad inventive concept thereof, and that elements disclosed in connection with particular embodiments could be used with other embodiments. It is understood, therefore, that this invention is not limited to the particular embodiments disclosed, but it is intended to cover modifications within the spirit and scope of the present invention as defined by the appended claims.

We claim:

1. An apparatus for securing a computer diskette to an object including a computer diskette, having first and second sides, a top edge and a bottom edge, and a determined thickness, with a label being located on the first side of the computer diskette adjacent to the top edge, located therein, the computer diskette holder comprising:

a first panel having opposing first and second edges, and opposing third and fourth edges;

a second panel having opposing first and second edges, and opposing third and fourth edges;

a third panel extending between the first edges of the first and second panels;

a fourth panel extending between the second edges of the first and second panels;

a fifth panel attached to the third edge of the second panel such that a space for receiving the diskette is formed between the first, second, third, fourth and fifth panels, the space being sized to accommodate one computer diskette;

the third edge of the first panel being located at a position which is above the fourth edge of the second panel, such that the label portion of the computer diskette is exposed on a first side of the computer diskette holder, and the fourth edge of the first panel extending above the computer diskette when the computer diskette is installed within the space such that a portion of the second side of the computer diskette adjacent to the bottom edge of the diskette is exposed on a second side of the computer diskette holder such that a user can access the second side of the computer diskette for removal of the computer diskette from the holder;

a first diskette retainer being located on the first panel above the top edge of the diskette which engages the top edge of the computer diskette when the computer diskette is located in the space;

a resilient retaining member extending from the first panel, the retaining member being adapted to releasably engage the object to secure the computer diskette to the object.

2. The apparatus of claim 1 further comprising means adapted for removably securing the computer diskette holder to a computer diskette storage container affixed to at least one of the first, second, third, fourth and fifth panels.

* * * * *